Aug. 15, 1961 W. H. CHANNELL ET AL 2,996,567
CABLE SPLICE ENCLOSURE
Filed Jan. 27, 1959 2 Sheets-Sheet 1

WILLIAM H. CHANNELL,
JAMES W. CHANNELL,
INVENTORS

BY
ATTORNEY

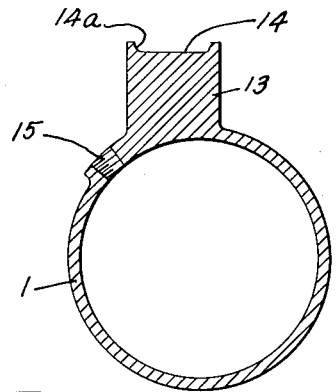
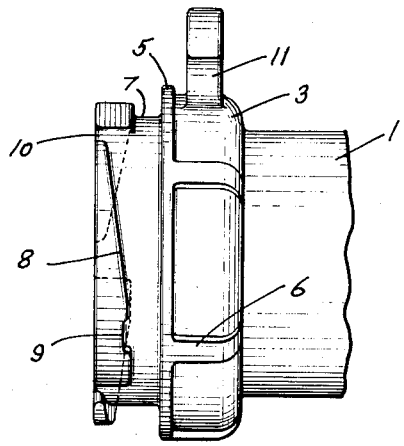
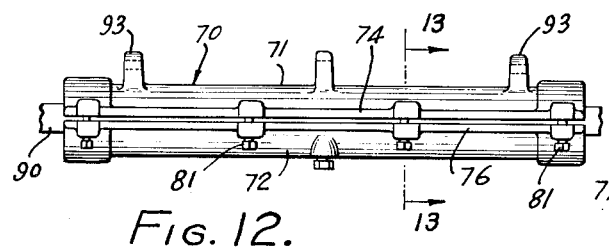

United States Patent Office 2,996,567
Patented Aug. 15, 1961

2,996,567
CABLE SPLICE ENCLOSURE
William H. Channell, 122 Oak Tree Drive, Glendora, Calif., and James W. Channell, 2415 Roanoke Road, San Marino, Calif.
Filed Jan. 27, 1959, Ser. No. 789,425
1 Claim. (Cl. 174—92)

The present invention relates to a cable splice enclosure adapted to confine a splice of any type or a sheath opening within the same.

The cable splice enclosure is easily placed in position of service and is provided with means whereby the splice enclosure may be secured to a supporting strand by a snap-on action, and which enclosure is weather resistant at both high or very low temperatures. Furthermore the cable enclosure is air and water tight when in service.

An object of the invention is the provision of a cable splice enclosure which may be installed by unskilled workmen, requires a minimum of parts for installation and which may be installed in a short period of time and re-entered readily when necessary.

Another object is the provision of a cable splice enclosure which is salvagable for relocation with resulting economy.

The last object is of importance for the reason that the average splice must be abandoned entirely upon relocation of cable.

A further object is the provision of a cable splice enclosure, adapted to handle different sizes and types of cable to the end that one type of enclosure will be satisfactory for most cable requirements encountered in the field.

The present invention covers the entire range of cable sizes by using only four sizes of casing or splice enclosure. The same casing may be used for straight, branch, three to seven-way on higher splices, by using different type grommets.

Plastic, aluminum, neoprene and other cables have come into use, but it is evident that a joint cannot be "wiped" when such a cable is utilized. With our invention, these cables are readily incorporated within the enclosure when a joint is required.

A further object is the provision of a cable splice enclosure which may include a plurality of enclosure members easily connected together so as to readily handle a long length of cable.

Other objects include a cable splice enclosure which is generally superior to devices now known to the inventors for use with cables.

With the above mentioned and other objects in view, the invention consists in the novel and useful provision, formation, construction, and association of parts, members and features, all as shown in certain embodiments in the accompanying drawings, described generally, and more particularly pointed out in the claims.

In the drawings:

FIGURE 7 is a fragmentary side elevation of one end of the splice enclosure;

FIGURE 8 is a sectional view on the line 8—8 of FIGURE 1, and on an enlarged scale;

FIGURE 9 is a fragmentary, partially sectional view, of a grommet used in the practice of the invention;

FIGURE 10 is a fragmentary side elevation, partly in section, showing cable splice enclosures secured together;

FIGURE 11 is a sectional view on the line 11—11 of FIGURE 10;

FIGURE 12 is a fragmentary side elevation of a modified form of cable splice enclosure; and FIGURE 13 is a sectional view on the line 13—13 of FIGURE 12 and on an enlarged scale.

Figure 2:
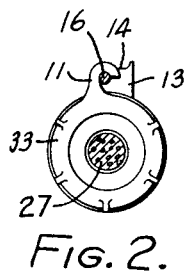
FIGURE 2 is an end elevation looking in the direction of the arrow 2 of FIGURE 1.
Figure 1:
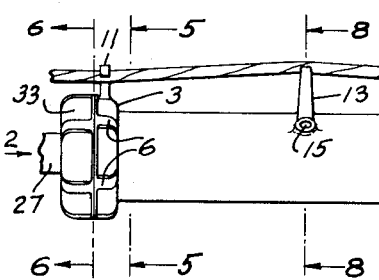
FIGURE 1 is a fragmentary side elevation of a cable splice enclosure shown attached to a supporting strand.
Figure 3:
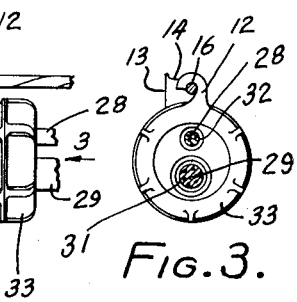
FIGURE 3 is an elevation looking in the direction of the arrow 3 of FIGURE 1.
Figure 4:
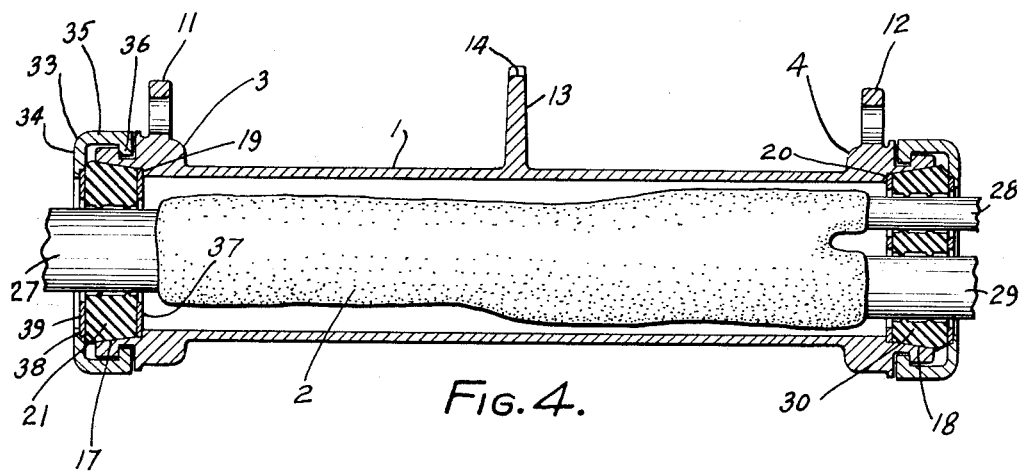
FIGURE 4 is an enlarged fragmentary view, shown in the longitudinal vertical section, of the cable splice enclosure of FIGURE 1 and showing a spliced cable within the enclosure.
Figure 5:
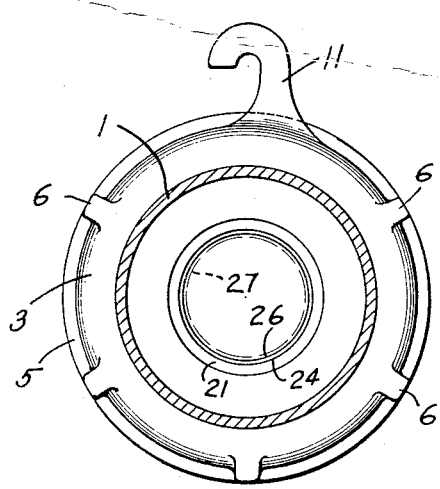
FIGURE 5 is a sectional view on the line 5—5 of FIGURE 1, and on an enlarged scale.
Figure 6:
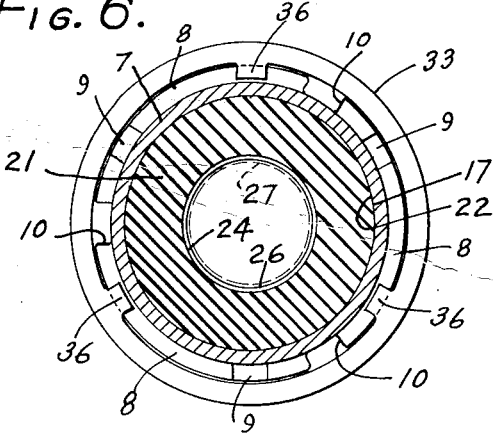
FIGURE 6 is a sectional view on the line 6—6 of FIGURE 1, and on an enlarged scale.

Referring now to the drawings:

The cable splice enclosure of FIGURES 1 to 11 inclusive includes a sleeve 1 for confining a cable splice indicated at 2, the sleeve 1 provided at each end with an integrally formed, enlarged collar, boss or flange, as shown at 3 and 4, with each collar provided with an end or rim flange 5 (FIGURE 7) and with a plurality of radial, peripheral ribs 6. The sleeve construction is such that forward of the rim flange end the sleeve diameter is increased to provide an extension 7 provided with a series of circumferentially arranged and aligned, spaced apart, cam faced lugs 8, with each cam face provided with a notch 9. The outermost end of the portion 7 is such that the end faces of the said lugs all lie in the same plane. This construction provides ways as illustrated at 10 between adjacent lugs. As shown in FIGURE 4, the casting for the sleeve is such as to include the end structures just recited. In addition, the bosses 3 and 4 are provided with upstanding hooks 11 and 12, the centers of which hooks are in axial alignment. A table member 13 is provided intermediate the length of the sleeve, the table member comprising an enlarged lug extending outwardly from the sleeve and provided with a depressed portion 14 at its upper end and which portion 14 is in alignment with and above the hook centers. As shown in FIGURE 8 the sleeve is enlarged as to external diameter where the member 13 is joined thereto and the enlarged portion is formed with a threaded bore 15. The depressed portion 14 extends at a height greater than the aligned centers of the hook portions 11 and 12 and likewise to one side of the aligned centers so that when the hook portions are engaging a strand 16 the sleeve may be manipulated so as to have the strand engage the portion 14 at 14a by axially rotating the sleeve, followed by counter-rotation of the sleeve which causes the strand to move on the portion 14 to bend the strand upwardly between the hook portions and thereby tension the strand and assure that the sleeve is tightly held on the supporting strand against movement.

The inner surface of both mouth ends of the sleeve and particularly the portions 3 and 4 are tapered as shown at 17 and 18. The taper is such with relation to the internal diameter of the sleeve that an annular shoulder is provided for each end at 19 and 20. The tapered portions 17 and 18 are adapted to receive grommets 21 and in the construction shown in FIGURE 9, each grommet has an elongated, tapered, peripheral surface 22, and a short width tapered peripheral surface 23. Within the bore 24 of the grommet are a pair of circular, spaced apart, annular beads 25 and 26. As shown in FIGURE 4, the grommet 21 is adapted to surround a length of cable 27 and it is intended that the grommet should fit tightly around the periphery of this portion of the cable 27 and engage the annular beads 25 and 26, these beads functioning in much the same way as O-rings. It is noted upon reference to FIGURE 4 that the cable is spliced within the sleeve and is provided with two branches at 28 and 29. Hence, the grommet 30 as shown in FIGURE 3 will have holes therein through which the branches 28 and 29 are passed, one hole in said grommet, to wit: 31, accommodating branch 29 while a smaller diameter hole at 32 accommodates cable branch 28. Within each hole of the grommet we may provide annular beads such as shown at 25 and 26 for a grommet 21.

End caps 33 are provided for the sleeve. The end caps are of identical construction, and referring to FIGURE 4, each end cap includes an annular wall 34, a side wall 35 secured to wall 34, the side wall provided with inwardly extending radial lugs 36 of which there may be a plurality. The number of said lugs will depend on the number of tapered or cam surfaced lugs carried on the sleeve ends and the lugs 36 are of a width which permits their passage through the ways 10 whereby upon a turning of the cap the cap will be forcibly moved axially inwardly by the said lugs 36 engaging the tapered or cam surfaces of lugs 8. The notches 9 are of greater width than that of the lugs 36 so that at a given point lugs 36 will fall within the said notches 9 to lock the cap against rotation. As shown in FIGURE 4 a washer 37 surrounds the cable end 27 and seats against the shoulder 19. The grommet 21 in turn has its smallest diameter end engaging the washer 37 with the tapered surface 22 thereof in engagement with the tapered surface 17. That portion of the grommets which has the tapered portion 23, extends outwardly from the end of the sleeve. The cap 33 is internally provided with an annular shoulder 38 which acts as a seat for a washer 39, which washer bears against the outer surface of the grommet. Thus each side of the grommet is backed by a washer. It is perhaps obvious that when the cap is rotated to cause an interlock with the end 3 of the sleeve that the grommet will be compressed and thus will be forced into engagement with the wall bounding the tapered bore 17 with the beads 25 and 26 tightly engaging the periphery of the cable portion 27 to provide a fluid type connection between the cable and the sleeve. The opposite end 4 of the sleeve accommodates two branch cables and the washer construction for this end is such as provide two openings for passage therethrough of said branches 28 and 29. The cap compresses the grommet as before, the grommet being interposed between two washers to provide a fluid type connection with the branches, the grommet and the sleeve.

Cable bends often prevent the sliding of the full length enclosure on one end of the cable and when this occurs, it is necessary to divide the enclosure and slide one half section over each cable end before starting a splice, in the manner shown in FIGURE 10. One end of each sleeve 50 and 51 is constructed in the manner just described for the showing of FIGURE 4 being the cap receiving ends while the opposite end is provided with an integral annular flange or boss 52 for sleeve 51 and 53 for sleeve 50. There is an extension of the sleeve 51 beyond the boss or flange 52 as shown at 54 and this extension is provided with separated circumferential segmental keys or lugs 55 which resemble the lugs shown in FIGURE 7. The flange 53 is internally provided with lugs 56 which are formed with tapered or cam surfaces, the surfaces of which are complementary to the tapered or cam surfaces of the lugs 55. Flange 52 is provided with an annular groove 57 for receiving a packing ring or gasket 58 for contact with the outer face of flange 53 while flange 53 is formed with an annular groove 59 for confining a packing ring 60 which bears against the end of the sleeve 51. Both flanges 52 and 53 are provided with spaced apart radial holes 61 and 62. These holes are for receiving ends of a spanner wrench whereby the parts may be relatively rotated to cause an interlocking relationship. The ribs on both the caps and the bosses 3 and 4 are for spanner wrench engagement to cause relative turning movement between the parts to cause an interlock between a cap with a boss or for release of a cap.

That form of the invention shown in FIGURES 12 and 13 differs from the form just described in that the form just described is not split. The split form is used for existing cables where no cable ends exist for sliding on an enclosure. In the split form, the casing 70 is diametrically split to provide two portions 71 and 72, each portion being diametrically flanged as shown at 73, 74, 75 and 76. Flange portions 73 and 75 are hinged at 77. Flange 76 has a threaded bore at 78 and is provided with an enlarged counterbore at 79. Flange 74 is provided with a screw threaded bore 80 in axial alignment with the bores 78 and 79. A bolt 81 having an angular sided head 82 has a stem 83 extending therefrom which stem connects with an enlarged screw threaded end 84. The diameter of the head 81 is greater than the diameter of bore 78 which bore 78 may accommodate the threaded end 84. The contiguous faces of the flanges 73, 74, 75 and 76 are provided with aligned grooves for receiving gaskets therein and therebetween as shown at 85 and 86. The enlarged ends of the split sleeve are formed in much the same manner as that form of the invention shown in FIGURE 4 in that said ends are internally tapered to receive split grommets of the type shown in FIGURE 9 with a split face as at 21a for encircling the cable together with split washers on both sides of the grommet and surrounding the cable. Hence, when the two halves of the sleeve are brought together around the cable shown at 90, a grommet will surround the cable at each end as shown at 91 with washers backing the grommet as shown at 92 and which grommet as well as the gaskets 85 and 86 will be compressed when the bolt 81 has threaded engagement with the threaded bore 80 and the bolt is tightened. Quite obviously, the two halves of the casing when brought together may be open at a slight angle but the construction of the bolt with relation to the bore 78 is such that the bolt may be at an angle within the bore 78 to permit the threaded end 84 to engage the threads in the bore 80. A plurality of these bolts is provided as shown in FIGURE 12 and the two halves may be tightened together. As before, one of the halves is provided with hooks 93 and said half of the casing is likewise provided with either a member like 13 or with an additional hook of greater height than the hooks 93 for the purpose of placing the supporting strand for the splice enclosure under tension.

The operation, uses and advantages of the invention just described are as follows:

To those skilled in the art, the operation and use of cable splice enclosure is undoubtedly obvious. However, by way of brief description, after the workman has spliced the cable such as shown in FIGURE 4 for either a straight splice or a branch splice, the splice portion is usually wrapped. With the present invention, the cable to be spliced is first passed through the cap, a pair of washers with the interposed grommet following which, if two branches are to be provided for the cable, as shown at 28 and 29, a cap is slid over the branches together with the grommet and two washers along with the cable sleeve. After the splice has been made and wrapped, the sleeve is then passed over the splice and the grommets along with the caps are then moved towards ends of the sleeve which, of course, will move the grommets and washers within the tapered bores at ends of the sleeve. A spanner wrench applied to the caps and likewise to the sleeve allows each cap to be tightened to the sleeve, due to the bayonet type locking members provided at each end. A test may then be run by applying gas such as dry N under pressure through the opening 15 to determine whether or not the interior of the sleeve is air tight after which the hole is closed by a plug.

The same procedure is followed for the form of the invention shown in FIGURES 12 and 13 save and except that this form of the invention has a split sleeve the two halves of which are brought together over the splice. In the form shown in FIGURE 10 an extra long cable splice is accommodated, the cap ends are the same for the sleeve shown in FIGURE 4 with the flanged ends 52 and 53 brought together and locked by the bayonet type locking members.

We claim:

A water and air tight cable splice closure comprising an elongated open-ended cylindrical sleeve having internally tapered portions proximate each end and of larger diameter than the bore of the sleeve, said sleeve being formed of two similar semi-cyclindrical parts hinged together at one side and having securing means at the opposite side, each sleeve part having two parallel, diametrically opposed, longitudinally grooved flanges, a pair of elongated gaskets in the four grooves to form a seal, two spaced hooks on one of the sleeve parts for engaging the usual supporting messenger strand, a table member between the two hooks and taller than the hooks to place the strand under tension, a spliced cable within the sleeve and having ends extending beyond the two ends of the sleeve, and an annular resilient grommet closing each end of the sleeve, split and engaging a proximate portion of the cable and having two oppositely tapered peripheral portions, one tapered portion engaging the proximate internally tapered portion of the sleeve.

References Cited in the file of this patent

UNITED STATES PATENTS

| | | |
|---|---|---|
| 707,055 | Earl | Aug. 12, 1902 |
| 965,684 | Bierce et al. | July 26, 1910 |
| 1,977,774 | Osborne | Oct. 23, 1934 |
| 2,311,427 | Winkelmeyer | Feb. 16, 1943 |
| 2,367,836 | Brown | Jan. 23, 1945 |
| 2,390,928 | Del Mar et al. | Dec. 11, 1945 |
| 2,414,106 | Kelly | Jan. 14, 1947 |
| 2,517,717 | Rose | Aug. 8, 1950 |
| 2,621,228 | Tompers | Dec. 9, 1952 |
| 2,668,316 | Sturdevant et al. | Feb. 9, 1954 |
| 2,683,304 | Channell | July 13, 1954 |
| 2,688,651 | Blake | Sept. 7, 1954 |
| 2,735,993 | Humphrey | Feb. 21, 1956 |
| 2,771,502 | King et al. | Nov. 20, 1956 |
| 2,788,385 | Doering et al. | Apr. 9, 1957 |
| 2,839,596 | Cheney et al. | June 17, 1958 |

FOREIGN PATENTS

| | | |
|---|---|---|
| 716,778 | Great Britain | Oct. 13, 1954 |